United States Patent
Takizawa (10) Patent No.: US 7,013,368 B2
(45) Date of Patent: Mar. 14, 2006

(54) ARBITRATION APPARATUS UTILIZING MUTLILEVEL PRIORITY FOR REDUCING MEMORY ACCESS TIME

(75) Inventor: Tetsuro Takizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 405 days.

(21) Appl. No.: 10/296,589

(22) PCT Filed: Jun. 7, 2001

(86) PCT No.: PCT/JP01/04808

§ 371 (c)(1),
(2), (4) Date: Nov. 26, 2002

(87) PCT Pub. No.: WO01/97040

PCT Pub. Date: Dec. 20, 2001

(65) Prior Publication Data

US 2003/0140201 A1 Jul. 24, 2003

(30) Foreign Application Priority Data

Jun. 13, 2000 (JP) .............................. 2000-182324

(51) Int. Cl.
*G06F 12/00* (2006.01)

(52) U.S. Cl. .................. 711/151; 711/105; 711/158

(58) Field of Classification Search ................ 711/151, 711/158, 105

See application file for complete search history.

(56) References Cited

U.S. PATENT DOCUMENTS

| 4,586,128 A | * | 4/1986 | DeWoskin ................... 710/113 |
| 4,760,521 A | * | 7/1988 | Rehwald et al. ............ 711/106 |
| 4,818,932 A | * | 4/1989 | Odenheimer ............ 324/121 R |
| 5,941,979 A | | 8/1999 | Lentz et al. |
| 6,026,464 A | * | 2/2000 | Cohen ........................... 711/5 |
| 6,137,807 A | * | 10/2000 | Rusu et al. .................. 370/429 |
| 6,317,813 B1 | * | 11/2001 | Su et al. ..................... 711/158 |
| 6,389,497 B1 | * | 5/2002 | Koslawsky et al. ......... 710/242 |
| 6,564,304 B1 | * | 5/2003 | Van Hook et al. .......... 711/154 |

FOREIGN PATENT DOCUMENTS

| JP | 7-200386 A | 8/1995 |
| JP | 10-228417 A | 8/1998 |
| JP | 935199 A2 | 8/1999 |
| JP | 2000-194683 | 7/2000 |

* cited by examiner

*Primary Examiner*—Stephen C. Elmore
(74) *Attorney, Agent, or Firm*—Foley & Lardner LLP

(57) ABSTRACT

Probabilities of the changeovers of access pages in the same bank and the changes of types of accesses, for instance the change from read to write or from write to read, are reduced and thereby data transmission performance is improved. If respective memory masters want to acquire the memory use right, they assert request signals and, at the same time, fix address signals and read/write signals. A memory arbitration circuit determines the priority order over the memory use right for the respective memory masters, and asserts an acknowledgement signal for a memory master having the highest priority.

36 Claims, 5 Drawing Sheets

ARBITRATION APPARATUS UTILIZING MUTLILEVEL PRIORITY FOR REDUCING MEMORY ACCESS TIME

TECHNICAL FIELD

The present invention relates to an arbitration apparatus for arbitrating among memory masters in authorization for the use of a memory when a plurality of memory masters request access to the memory.

BACKGROUND ART

In a system comprising a plurality of memory masters which share one memory, a memory arbitration circuit assigns memory use rights to the respective memory masters, and therefore determines the priority order of the memory masters. There are known three conventional methods for determining the priority order as follows:
1. a method of fixedly presetting the priority order; 2. a method of varying the settings of the priority order beforehand in order to, for example, deal with various applications; 3. a method of varying the priority order by round robin scheduling.

A DRAM (dynamic random access memory) such as SDRAM, DDR SDRAM, Direct Rambus is comprised of a plurality of banks. Addresses assigned to the DRAM include bank address for indicating the location of each bank, row address for indicating the location of a page in each bank, and column address for indicating a location in each page.

PROBLEMS THAT THE INVENTION IS TO SOLVE

Let it be assumed that after a page of a DRAM has been accessed, access to another page in the same bank occurs. In this case, it is necessary to write back the data stored in a sense amplifier to memory cells of the DRAM before accessing the other page so as to read the data of the other page into the sense amplifier.

In this manner, when successively accessing different pages to switch pages in the same bank, it is repeated that the data in the sense amplifier is written back to the memory cells of the DRAM, and then the data of the next access page is read into the sense amplifier. Thus, there is need for time interval before having subsequent access. On the other hand, access to a page in a different bank does not need such time interval, and these operations may be carried out in parallel.

Besides, in the DRAM, read data and write data are transmitted using the same signal line in common. Accordingly, it is necessary to place a certain period of time interval before operation is switched from read to write or from write to read on the occasion of changing access so as to prevent a collision of the data. That is, successive access to different pages in the same bank or operation effecting changes in types of accesses (read/write) deteriorates data transfer performance.

According to the conventional method of setting priority order, it is highly likely that data transfer performance is deteriorated because of the high possibility of the above-mentioned condition.

It is therefore an object of the present invention to provide an arbitration apparatus which decreases the probability of changeovers of access pages in the same bank and the changes of types of accesses, for instance, the change from read to write or from write to read, and thereby improves data transfer performance.

It is another object of the present invention to provide an arbitration apparatus which ensures that the memory use right is given to a certain memory master within a specified period of time, and thus preventing a buffer from overrunning or underrunning.

DISCLOSURE OF THE INVENTION

In accordance with the first aspect of the present invention, to achieve the objects above, there is provided an arbitration apparatus comprising: a plurality of memory masters each outputting a request signal for requesting the right to use a memory; and a memory arbitration circuit for giving the memory use right to a memory master selected from at least one memory master which has output the request signal.

In accordance with the second aspect of the present invention, in the first aspect, the memory masters each output signals that indicate the content of access to the memory when outputting the request signal, and the memory arbitration circuit gives the memory use right to a memory master selected from at least one memory master based on the signals indicating the content of access.

In accordance with the third aspect of the present invention, in the second aspect, the signals that indicate the content of access include: an address signal for indicating the address of the memory to access; and a read/write signal for indicating whether the access to the address is of read or write.

In accordance with the fourth aspect of the present invention, in the third aspect, the memory arbitration circuit assigns low priority to a memory master outputting the address signal indicating the same bank that has been accessed up to that time, assigns high priority to a memory master outputting the address signal indicating a bank different from the one that has been accessed up to that time and, when only one memory master of at least one memory master is given high priority, gives the memory use right to the memory master.

In accordance with the fifth aspect of the present invention, in the fourth aspect, the memory arbitration circuit is provided with the setting of fixed priority order in advance and, when having assigned high priority to plural memory masters of at least one memory master, gives the memory use right to a memory master having the highest priority among the memory masters with reference to the fixed priority order.

In accordance with the sixth aspect of the present invention, in the fifth aspect, the memory arbitration circuit gives the memory use right to a memory master having the highest fixed priority among at least one memory master when having assigned low priority to all of at least one memory master.

In accordance with the seventh aspect of the present invention, in the fourth aspect, the memory arbitration circuit gives the memory use right to a memory master that was given the memory use right least recently according to the round robin scheduling when having assigned high priority to plural memory masters of at least one memory master.

In accordance with the eighth aspect of the present invention, in the fourth or seventh aspect, the memory arbitration circuit gives the memory use right to a memory master that was given the memory use right least recently among at least one memory master according to the round robin scheduling when having assigned low priority to all of at least one memory master.

In accordance with the ninth aspect of the present invention, in the third aspect, the memory arbitration circuit is provided with the setting of a prescribed threshold in advance, and compares elapsed time after the last request signal output of each of at least one memory master with the threshold. The memory arbitration circuit assigns high priority to a memory master in which elapsed time is above the threshold according to the comparison results, assigns low priority to a memory master outputting the address signal indicating the same bank that has been accessed up to that time, assigns medium priority to a memory master outputting the address signal indicating a bank different from the one that has been accessed up to that time and, when only one memory master of at least one memory master is given high priority, gives the memory use right to the memory master.

In accordance with the tenth aspect of the present invention, in the ninth aspect, when no memory master of at least one memory master has been given high priority and one memory master has been given medium priority, the memory arbitration circuit gives the memory use right to the memory master having medium priority.

In accordance with the eleventh aspect of the present invention, in the ninth or tenth aspect, the memory arbitration circuit is provided with the setting of fixed priority order in advance and, when there are plural memory masters assigned with high priority out of at least one memory master, gives the memory use right to a memory master having the highest priority among the memory masters according to the fixed priority order.

In accordance with the twelfth aspect of the present invention, in one of the ninth to eleventh aspects, the memory arbitration circuit is provided with the setting of fixed priority order in advance and, when there are plural memory masters assigned with medium priority while no memory master of at least one memory master has been given high priority, gives the memory use right to a memory master having the highest priority among the memory masters according to the fixed priority order.

In accordance with the thirteenth aspect of the present invention, in one of the ninth to twelfth aspects, the memory arbitration circuit is provided with the setting of fixed priority order in advance and, when there is no memory master assigned with high priority nor one assigned with medium priority out of at least one memory master, gives the memory use right to a memory master having the highest priority among at least one memory master assigned with low priority according to the fixed priority order.

In accordance with the fourteenth aspect of the present invention, in the ninth aspect, when there are plural memory masters assigned with high priority out of at least one memory master, the memory arbitration circuit gives the memory use right to a memory master that was given the memory use right least recently among the memory masters having high priority according to the round robin scheduling.

In accordance with the fifteenth aspect of the present invention, in the ninth or fourteenth aspect, when there are plural memory masters assigned with medium priority while no memory master of at least one memory master has been given high priority, the memory arbitration circuit gives the memory use right to a memory master that was given the memory use right least recently among the memory masters having medium priority according to the round robin scheduling.

In accordance with the sixteenth aspect of the present invention, in the ninth, fourteenth or fifteenth aspect, when there is no memory master assigned with high priority nor one assigned with medium priority out of at least one memory master, the memory arbitration circuit gives the memory use right to a memory master that was given the memory use right least recently among at least one memory master having low priority according to the round robin scheduling.

In accordance with the seventeenth aspect of the present invention, in one of the first to sixteenth aspects, when only one memory master outputs the request signal, the memory arbitration circuit gives the memory use right to the memory master.

BEST MODE FOR CARRYING OUT THE INVENTION

In the following, preferred embodiments of the present invention will be described in detail with reference to the drawings.

Figure 1:
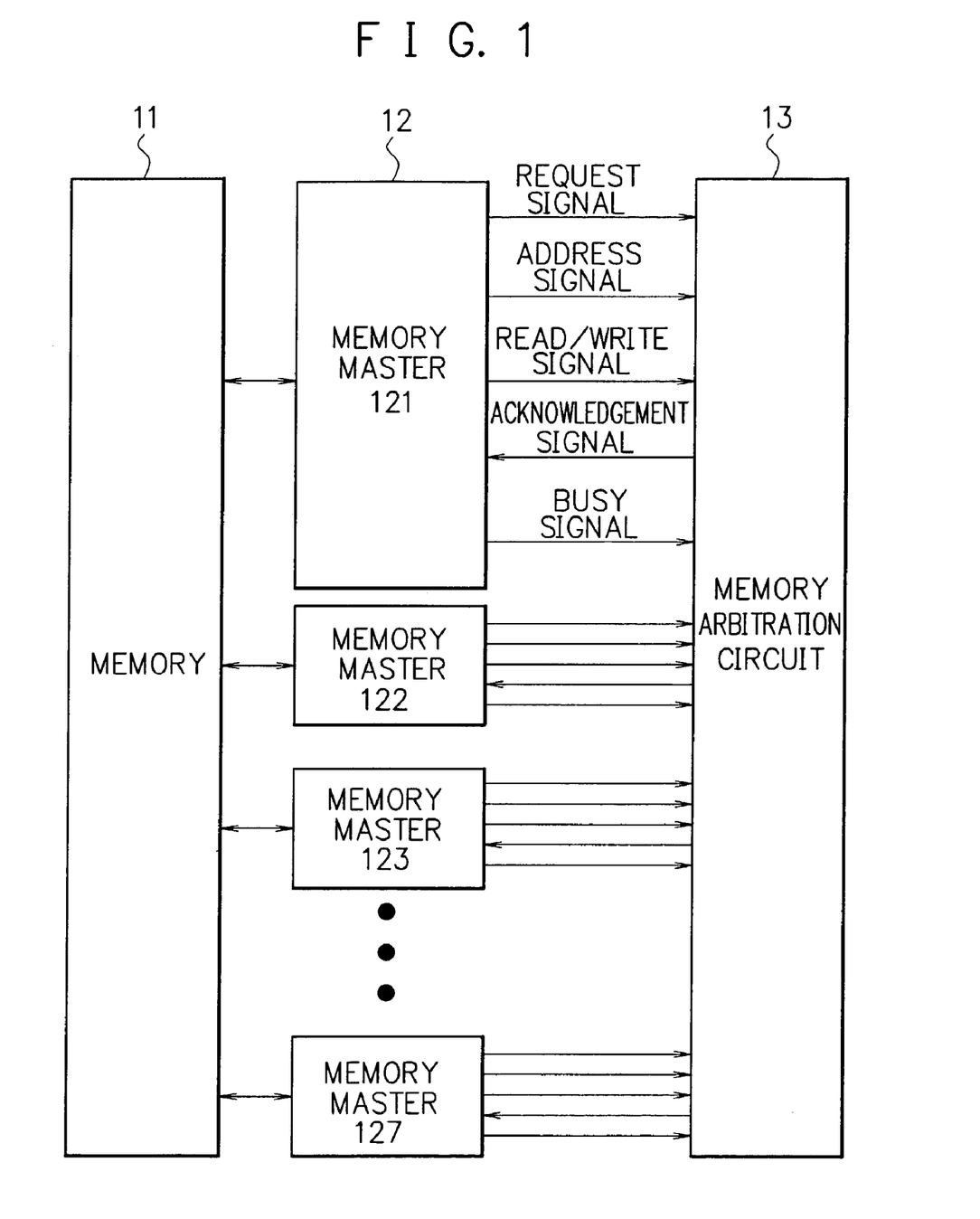
FIG. 1 is a block diagram showing the schematic configuration of an arbitration apparatus of the present invention.

FIG. 1 is a block diagram showing the schematic configuration of an arbitration apparatus of the present invention. Referring to FIG. 1, the arbitration apparatus of the present invention comprises a memory arbitration circuit 13, a plurality of memory masters 12, and a memory 11. The memory masters 12 each send the memory arbitration circuit 13 a request signal for requesting the memory use right, an address signal, a read/write signal for indicating the types of access (read/write) and a busy signal for indicating that the memory 11 is in use. The memory arbitration circuit 13 sends the memory master 12 an acknowledgement signal for assigning the memory use right.

If respective memory masters 12 want to obtain the memory use right, they assert the request signals and, at the same time, fix the address signals and read/write signals (access attributes S2). After that, when the memory arbitration circuit 13 asserts the acknowledgement signal for a memory master 12, the memory master 12 asserts the busy signal to begin the use of the memory 11. When terminating the use of the memory 11, the memory master 12 deasserts the busy signal.

The memory arbitration circuit 13 monitors the request signals and busy signals from the respective memory masters 12. When at least one memory master 12 asserts the request signal while all the memory masters 12 are not asserting the busy signal, the memory arbitration circuit 13 asserts the acknowledgement signal for one of the memory masters 12.

Next, a description will be given in detail of the arbitration apparatus according to the first embodiment of the present invention. The memory arbitration circuit 13 stores the last accessed bank and the type of the last access in the memory 11. When a memory master 12 asserts the request signal, the memory arbitration circuit 13 compares the address signal and read/write signal outputted from the memory master 12 with the stored bank and access type.

If the bank that the memory master 12 is going to access is different from the one that has been accessed up to that time and also the access type of the memory master 12 corresponds to the stored access type, the memory arbitration circuit 13 assigns high priority to the memory master 12. Otherwise, the memory arbitration circuit 13 assigns low priority to the memory master 12. When only the memory master 12 asserts the request signal, the memory arbitration circuit 13 asserts the acknowledgement signal for the memory master 12 to give the memory use right regardless of the priority order assigned to the memory master 12.

On the other hand, when two or more memory masters 12 asserts the request signals and only one of them has high priority, the memory arbitration circuit 13 asserts the acknowledgement signal for the memory master 12 to give the memory use right. When two or more memory masers 12 have high priority, the memory arbitration circuit 13 asserts the acknowledgement signal for the memory master 12 having the highest priority with reference to preset fixed priority order to give the memory use right.

In the case where all of the memory masters 12 are not given high priority but given low priority, the memory arbitration circuit 13 refers to the preset fixed priority order, and asserts the acknowledgement signal for the memory master 12 having the highest priority according to the fixed priority order to give the memory use right.

Figure 2:
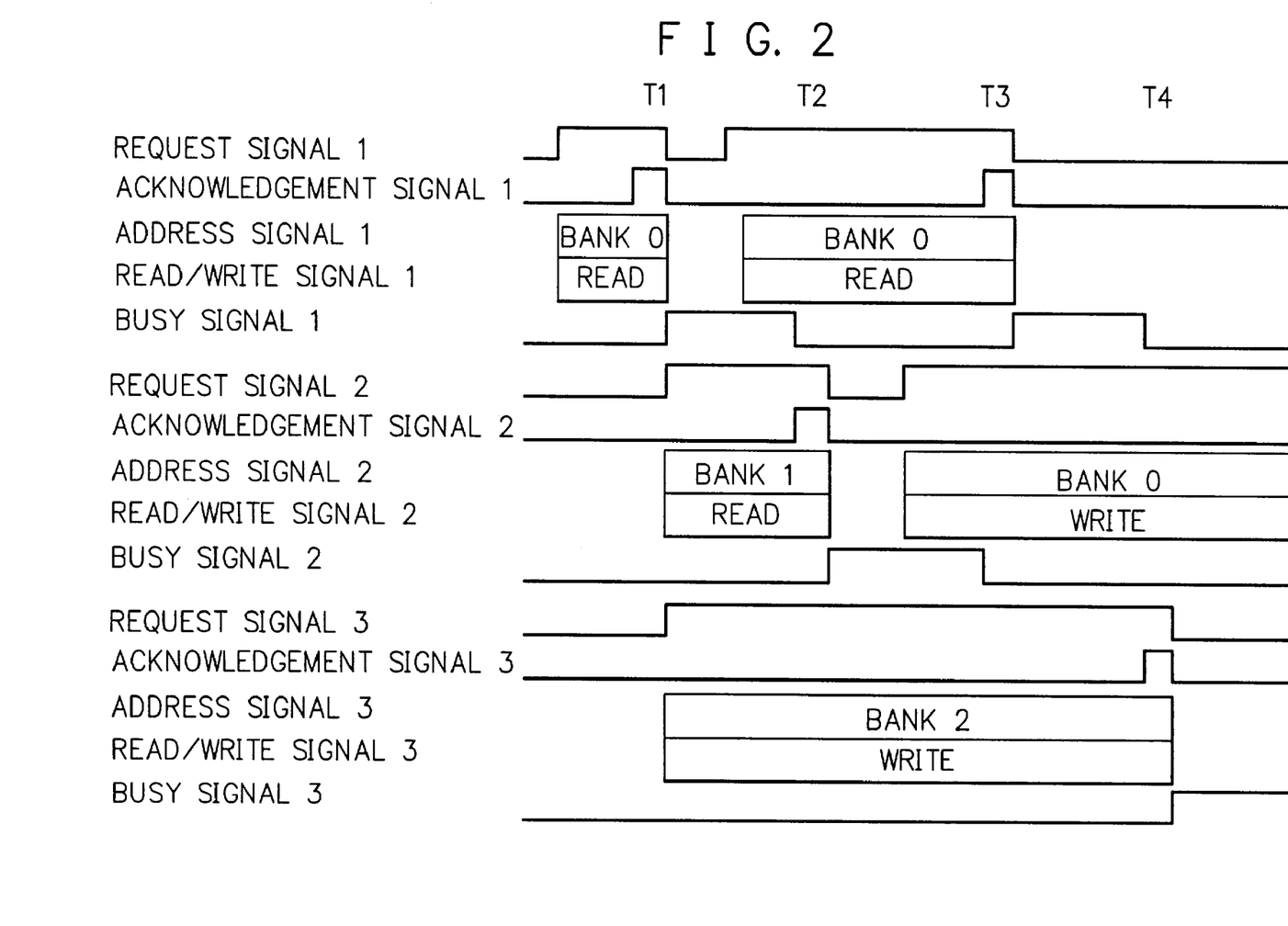
FIG. 2 is a timing chart of each signal for explaining the operation of the arbitration apparatus according to the first or second embodiment of the present invention.

FIG. 2 is a timing chart of each signal for explaining the operation of the arbitration apparatus according to the first or second embodiment of the present invention. Referring to FIG. 2, only memory master 121 asserts the request signal at the time T1. Consequently, the memory use right is given to the memory master 121.

At the time T2, all of the memory masters 12 (memory masters 121 to 123) assert the request signals. As can be seen in FIG. 2, since the address signal output from the memory master 121 indicates the same bank (bank 0) that is accessed for the time being, the memory master 121 is given low priority. On the other hand, the address signal output from the memory master 122 indicates a bank (bank 1) different from the bank 0 that is currently accessed by the memory master 121. In addition, the read/write signal from the memory master 122 indicates the same access type (read) as the type of current access (read). Therefore, the memory master 122 is given high priority.

The address signal output from the memory master 123 indicates a bank (bank 2) different from the bank 1 that is accessed for the time being. However, the read/write signal from the memory master 122 indicates an access type (write) different from the type of current access (read). Therefore, the memory master 123 is given low priority. Accordingly, the acknowledgement signal is asserted for the memory master 122 to give it the memory use right.

Also at the time T3, all of the memory masters 12 (memory masters 121 to 123) assert the request signals. The address signal output from the memory master 121 indicates a bank (bank 0) different from the bank 1 that is accessed for the time being. In addition, the read/write signal from the memory master 121 indicates the same access type (read) as the type of current access (read). Therefore, the memory master 121 is given high priority.

As for the memory masters 122 and 123, the address signals output therefrom indicate banks (banks 0 and 2) different from the bank 1 that is currently accessed. However, the read/write signals from the memory masters 122 and 123 indicate an access type (write) different from the type of current access (read). Therefore, the memory masters 122 and 123 are given low priority. Thus, only the memory master 121 has high priority at the time T3, and is given the memory use right.

At the time T4, the memory masters 122 and 123 assert the request signals. The address signal output from the memory master 122 indicates the same bank (bank 0) that is accessed for the time being, and therefore the memory master 122 is given low priority. Besides, the address signal output from the memory master 123 indicates a bank (bank 2) different from the bank 0 that is accessed for the time being. However, the read/write signal from the memory master 123 indicates an access type (write) different from the type of current access (read). Therefore, the memory master 123 is given low priority. As the result, there is no memory master 12 that has been given high priority at the time T4.

As is mentioned above, no memory master 12 has been given high priority and there are only low priority memory masters 12 at the time T4. In this case, on the supposition that the priority of the memory master 122 is set higher than that of the memory master 123 by the fixed priority order in this embodiment, the memory arbitration circuit 13 asserts the acknowledgement signal for the memory master 122. Thus, the memory master 122 is given the memory use right.

In the following, a description will be given in detail of the arbitration apparatus according to the second embodiment of the present invention. In the first embodiment, when there are two or more memory masters 12 having high priority, or when none of the memory masters 12 has been given high priority but they all have low priority, the memory arbitration circuit 13 gives the memory use right according to the preset fixed priority order S10. On the other hand, in this embodiment, the memory arbitration circuit 13 gives the memory use right according to the round robin scheduling S11 under such circumstances. (See FIG. 5c.) That is, in this embodiment, the memory master 12 that was given the memory use right least recently acquires the memory use right by priority (see S11a of FIG. 5c.).

Next, the operation of the arbitration apparatus according to the second embodiment of the present invention will be described with reference to FIG. 2. The operation at the time T1, T2 and T3 is the same as described previously in the first embodiment. At the time T4, there is no high priority memory master 12 and the memory masters 122 and 123 have been given low priority. In FIG. 2, the memory master 122 was given the memory use right at the time T2. Consequently, the memory master 123 has priority over the memory master 122 as to the memory use right according to the round robin scheduling. Thus, the memory master 123 is given the memory use right at the time T4.

In the following, a description will be given in detail of the arbitration apparatus according to the second embodiment of the present invention using FIGS. 4, 5a, and 5b. In this embodiment, the memory arbitration circuit 13 compares elapsed time S3a after each of the memory masters 12 asserted the last request signal with a preset threshold, and assigns high priority S4a to a memory master 12 in which elapsed time is above the threshold. (See FIG. 5a.) The threshold may be independently set with respect to each memory master 12.

Figure 5A:
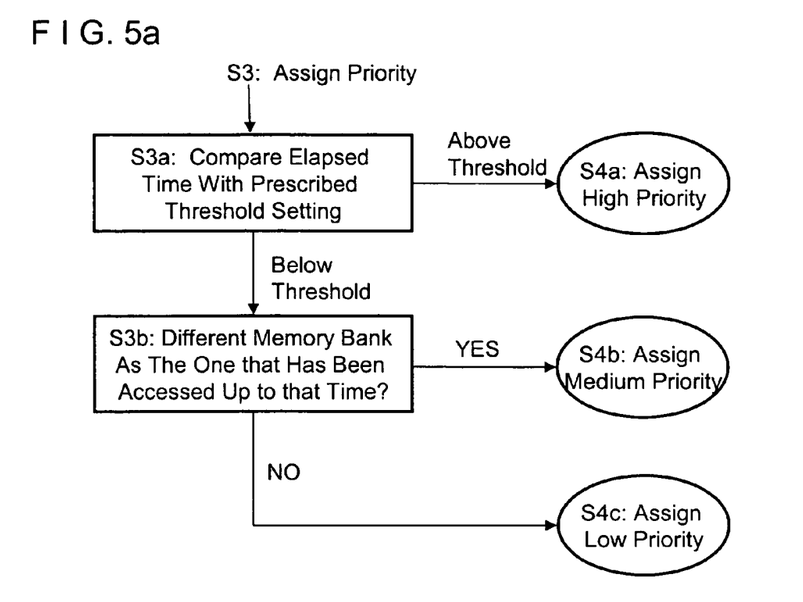
FIG. 5a, 5b, and 5c are flow diagrams explaining some elements of the flow diagram in FIG. 4.
Figure 5B:
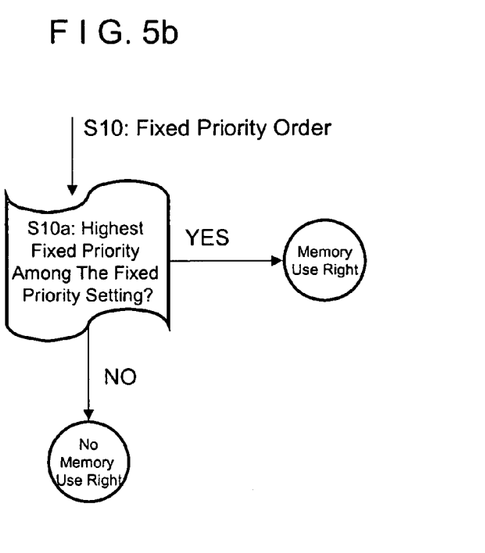
Figure 5C:
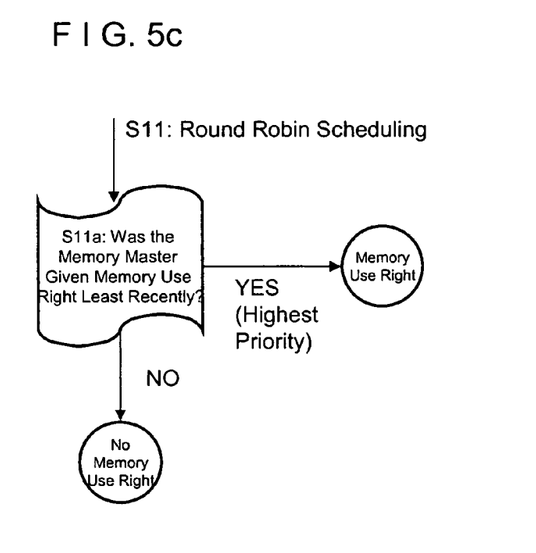

As shown in FIG. 5a, when elapsed time is below the threshold, the memory arbitration circuit 13 compares the last accessed bank and the type of the last access with respective address signals and read/write signals outputted from the memory masters 12 that assert the request signals as with the first and second embodiments. As a result, the memory arbitration circuit 13 assigns medium priority S4b to a memory master 12 outputting the address signal indicating a bank different from the one that has been accessed up to that time S3b, and assigns low priority S4c to other memory masters.

Figure 4:
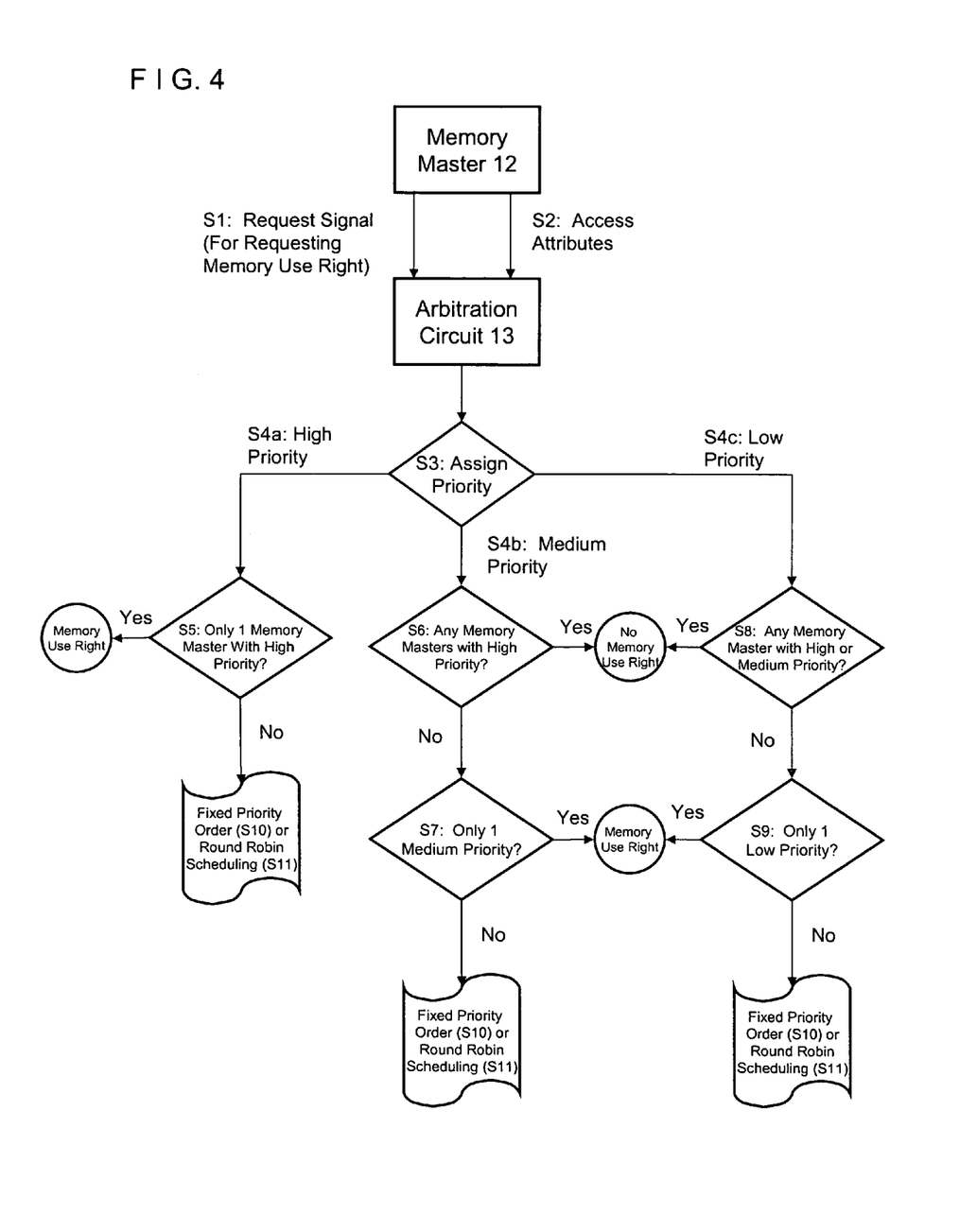
FIG. 4 is a flow diagram explaining the operation of the arbitration apparatus according to the third or the fourth embodiment of the present invention.

As shown in FIG. 4, when only one memory master 12 asserts the request signal S1, the memory arbitration circuit 13 asserts the acknowledgement signal for the memory master 12 to give the memory use right regardless of the priority order assigned to the memory master 12. (See, for example, S9 in FIG. 4.) On the other hand, when two or more memory masters 12 asserts the request signals S1 and only one of them has high priority S5, the memory arbitration circuit 13 asserts the acknowledgement signal for the memory master 12 to give the memory use right. When there is only one memory master 12 assigned with medium priority S7 while no memory master 12 has been given high priority, the memory arbitration circuit 13 gives the memory use right to the memory master 12.

Besides, when there are two or more memory masters 12 assigned with medium priority while no memory master 12 has been given high priority S6, the memory arbitration circuit 13 gives the memory use right to a memory master 12 having the highest priority according to the preset fixed priority order S10a. (See FIGS. 4 and 5b.) When there is no memory master 12 assigned with high priority nor one assigned with medium priority S8 and all the memory masters 12 have been given low priority, the memory arbitration circuit 13 also gives the memory use right to a memory master having the highest priority according to the fixed priority order S10a. (See FIGS. 4 and 5b.) Similarly, when there are plural memory masters 12 assigned with high priority, the memory arbitration circuit 13 gives the memory use right to a memory master having the highest priority according to the fixed priority order S10a. (See FIGS. 4 and 5b.)

Figure 3:
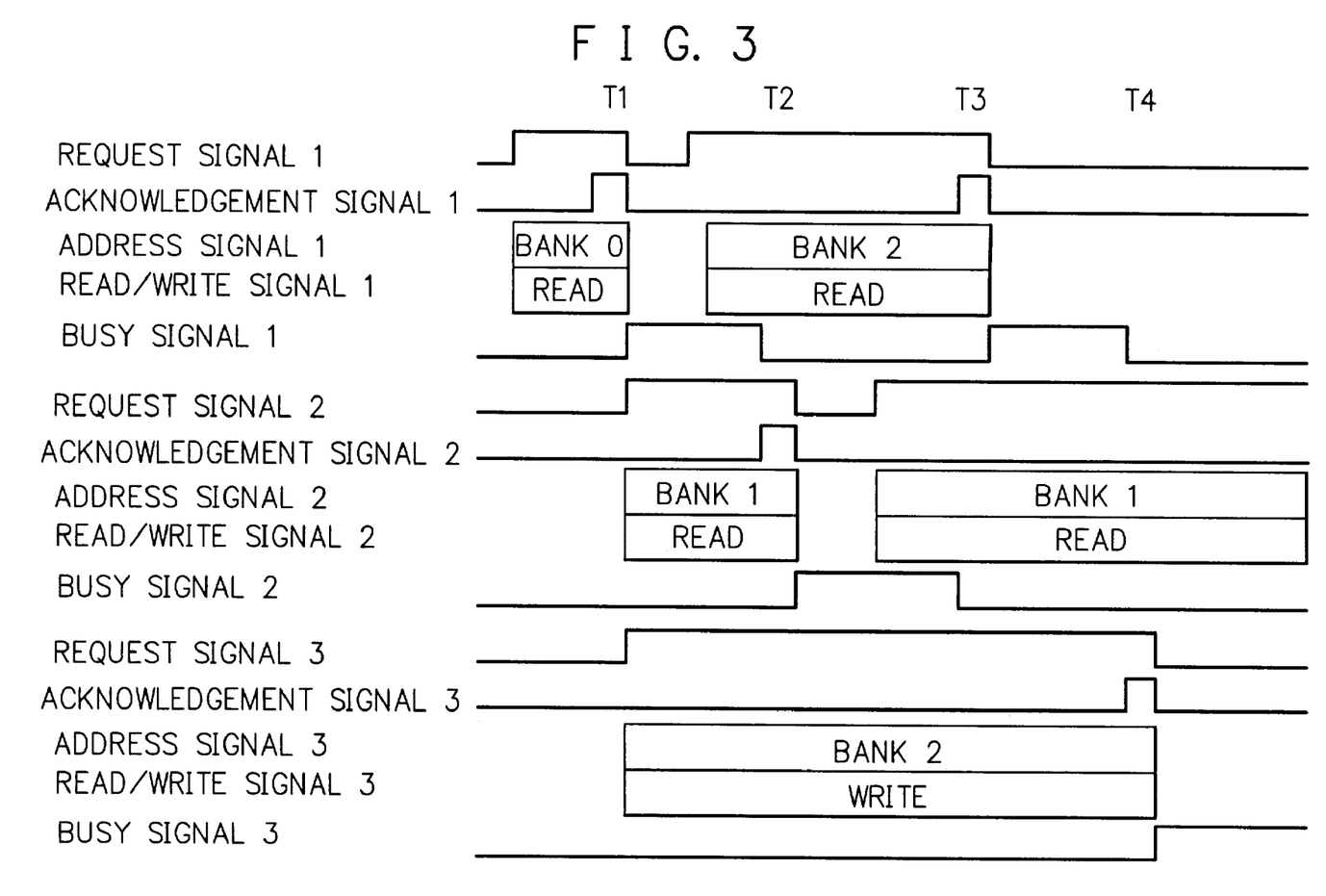
FIG. 3 is a timing chart of each signal for explaining the operation of the arbitration apparatus according to the third or fourth embodiment of the present invention.

FIG. 3 is a timing chart of each signal for explaining the operation of the arbitration apparatus according to the third or fourth embodiment of the present invention. Referring to FIG. 3, only memory master 121 asserts the request signal at the time T1. Consequently, the memory use right is given to the memory master 121.

At the time T2, all of the memory masters 12 (memory masters 121 to 123) assert the request signals. The address signals output from the memory masters 121 and 122 indicate banks (banks 1 and 2) different from the bank 0 that is currently accessed. In addition, the read/write signals therefrom indicate the same access type (read) as the type of current access (read). Therefore, the memory masters 121 and 122 are given medium priority.

The address signal output from the memory master 123 indicates a bank (bank 2) different from the bank 0 that is accessed for the time being. However, the read/write signal from the memory master 123 indicates an access type (write) different from the type of current access (read). Therefore, the memory master 123 is given low priority. As the result, there is no memory master 12 that has been given high priority at the time T2, and there are plural medium priority memory masters 12. On the supposition that the priority of the memory master 122 is set higher than that of the memory master 121 according to the fixed priority order in this embodiment, the memory master 122 is given the memory use right. Supposing that the priority of the memory master 121 is set higher than that of the memory master 122 according to the fixed priority order, the memory master 121 is given the memory use right.

Also at the time T3, all of the memory masters 12 (memory masters 121 to 123) assert the request signals. The address signal output from the memory master 121 indicates a bank (bank 2) different from the bank 1 that is accessed for the time being. In addition, the read/write signal from the memory master 121 indicates the same access type (read) as the type of current access (read). Therefore, the memory master 121 is given medium priority.

The address signal output from the memory master 122 indicates the same bank (bank 1) that is accessed for the time being, and therefore the memory master 122 is given low priority. The address signal output from the memory master 123 indicates a bank (bank 2) different from the bank 1 that is accessed for the time being. However, the read/write signal from the memory master 123 indicates an access type (write) different from the type of current access (read). Therefore, the memory master 123 is given low priority. Thus, there is no memory master 12 having high priority, and only the memory master 121 has medium priority at the time T3. Accordingly, the memory master 121 is given the memory use right.

At the time T4, the memory masters 122 and 123 assert the request signals. The address signal output from the memory master 122 indicates a bank (bank 1) different from the bank 2 that is accessed for the time being, and the read/write signal therefrom indicates the same access type (read) as the type of current access (read). Additionally, it is assumed in this embodiment that elapsed time after the memory master 122 asserted the last request signal is below the preset threshold. Therefore, the memory master 122 is given medium priority.

Besides, assuming that elapsed time after the memory master 123 asserted the last request signal is longer than that in the memory master 122, and is above the preset threshold, the memory master 123 is given high priority. As the result, only the memory master 123 is given high priority and thus acquires the memory use right at the time T4. If the elapsed time after the memory master 123 asserted the last request signal is below the threshold, the memory master 123 is given low priority. Consequently, the memory master 122 is given the memory use right.

In the following, a description will be given of the arbitration apparatus according to the fourth embodiment of the present invention. In the third embodiment, when there are two or more memory masters 12 having high priority, when none of the memory masters 12 has been given high priority and there are two or more memory masters 12 having medium priority, or when there is no memory master 12 assigned with high priority nor one assigned with medium priority and there are two or more memory masters 12 assigned with low priority, the memory arbitration circuit 13 determines the priority order over the memory use right according to the preset fixed priority order S10. On the other hand, in this embodiment, the memory arbitration circuit 13 gives the memory use right according to the round robin scheduling S11 as is described in the second embodiment.

Next, the operation of the arbitration apparatus according to the third embodiment of the present invention will be described with reference to FIG. 3. The operation at the time T1, T3 and T4 is the same as described previously in the third embodiment. At the time T2, the memory masters 121 and 122 have been given medium priority, and the 123 has been given low priority. That is, there is no high priority memory master 12, but there are plural medium priority memory masters 12.

In FIG. 3, the memory master 121 was given the memory use right at the time T1. Even if the memory master 122 has been given the memory use right before, it was before the memory master 121 was given the memory use right. Thus, the memory master 122 is given the memory use right according to the round robin scheduling.

INDUSTRIAL APPLICABILITY

As is obvious from the above description, in accordance with the present invention, it is possible to reduce the probabilities of the changeovers of access pages in the same bank and the changes of types of accesses, for instance the change from read to write or from write to read. Thus, data transmission performance is improved.

Moreover, in accordance with the third and fourth embodiments of the present invention, it is ensured that memory use right is given to a certain memory master within a specified period of time, which prevents a buffer from overrunning or underrunning.

What is claimed is:

1. An arbitration apparatus comprising:
a plurality of memory masters each outputting a request signal for requesting a memory use right; and
a memory arbitration circuit for giving the memory use right to one of the memory masters selected from the memory masters which have output the request signals,
wherein the memory masters each output signals that indicate access attributes to the memory when outputting the request signal,
wherein when plural memory masters have output the request signals, the memory arbitration circuit gives the memory use right to a memory master selected from the memory masters based on the signals indicating the access attributes.
wherein the memory arbitration circuit assigns low priority to a first memory master outputting the address signal indicating a first memory bank that is the same as the one that has been accessed up to that time, assigns high priority to a second memory master outputting the address signal indicating a memory bank different from the one that has been accessed up to that time and, when only one memory master is given high priority, gives the memory use right to the one memory master.

2. The arbitration apparatus claimed in claim 1, wherein the memory arbitration circuit is provided with a fixed priority order setting in advance and, when having assigned high priority to plural memory masters, gives the memory use right to a memory master having a highest priority among the memory masters with reference to the fixed priority order setting.

3. The arbitration apparatus claimed in claim 2, wherein the memory arbitration circuit gives the memory use right to a memory master having a highest fixed priority among the memory masters when having assigned low priority to all the memory masters.

4. The arbitration apparatus claimed in claim 3, wherein when only one memory master outputs the request signal, the memory arbitration circuit gives the memory use right to the one memory master.

5. The arbitration apparatus claimed in claim 2, wherein when only one memory master outputs the request signal, the memory arbitration circuit gives the memory use right to the one memory master.

6. The arbitration apparatus claimed in claim 1, wherein the memory arbitration circuit gives the memory use right to a memory master that was given the memory use right least recently according to a round robin scheduling when having assigned high priority to plural memory masters.

7. The arbitration apparatus claimed in claim 6, wherein the memory arbitration circuit gives the memory use right to a memory master that was given the memory use right least recently among the memory masters according to a round robin scheduling when having assigned low priority to all the memory masters.

8. The arbitration apparatus claimed in claim 6, wherein when only one memory master outputs the request signal, the memory arbitration circuit gives the memory use right to the one memory master.

9. The arbitration apparatus claimed in claim 1, wherein the memory arbitration circuit gives the memory use right to a memory master that was given the memory use right least recently among the memory masters according to a round robin scheduling when having assigned low priority to all the memory masters.

10. The arbitration apparatus claimed in claim 9, wherein when only one memory master outputs the request signal, the memory arbitration circuit gives the memory use right to the one memory master.

11. The arbitration apparatus claimed in claim 1, wherein when only one memory master outputs the request signal, the memory arbitration circuit gives the memory use right to the one memory master.

12. An arbitration apparatus comprising:
a plurality of memory masters each outputting a request signal for requesting a memory use right; and
a memory arbitration circuit for giving the memory use right to one of the memory masters selected from the memory masters which have output the request signals,
wherein the memory masters each output signals that indicate access attributes to the memory when outputting the request signal;
wherein when plural memory masters have output the request signals, the memory arbitration circuit gives the memory use right to a memory master selected from the memory masters based on the signals indicating the access attributes;
wherein the signals that indicate the access attributes include: an address signal for indicating the address of the memory to access; and a read/write signal for indicating whether the access to the address is a read access or a write access; and
wherein the memory arbitration circuit is provided with a prescribed threshold setting in advance to compare elapsed time after a last request signal output of each memory master with the threshold, and assigns high priority to a first memory master in which elapsed time is above the threshold, assigns low priority to a second memory master outputting the address signal indicating a memory bank same as the memory bank that has been accessed up to that time, assigns medium priority to a third memory master outputting the address signal indicating a memory bank different from the one that has been accessed up to that time and, when only one memory master is given high priority, gives the memory use right to the one memory master.

13. The arbitration apparatus claimed in claim 12, wherein when no memory master has been given high priority and there is one memory master assigned with medium priority, the memory arbitration circuit gives the memory use right to the memory master having medium priority.

14. The arbitration apparatus claimed in claim 13, wherein the memory arbitration circuit is provided with a fixed priority order setting in advance and, when there are plural memory masters assigned with high priority, gives the memory use right to a memory master having a highest priority among the memory masters according to the fixed priority order setting.

15. The arbitration apparatus claimed in claim 13, wherein, the memory arbitration circuit is provided with a fixed priority order setting in advance and, when there are plural memory masters assigned with medium priority while no memory master has been given high priority, gives the memory use right to a memory master having a highest priority among the memory masters according to the fixed priority order setting.

16. The arbitration apparatus claimed in claim 13, wherein the memory arbitration circuit is provided with a setting of fixed priority order setting in advance and, when there is no memory master assigned with high priority nor one assigned with medium priority, gives the memory use right to a sixth memory master having a highest priority among the memory masters assigned with low priority according to the fixed priority order setting.

17. The arbitration apparatus claimed in claim 13, wherein when only one memory master outputs the request signal, the memory arbitration circuit gives the memory use right to the one memory master.

18. The arbitration apparatus claimed in claim 12, wherein the memory arbitration circuit is provided with the fixed priority order setting in advance and, when there are plural memory masters assigned with high priority, gives the memory use right to a memory master having a highest priority among the memory masters according to the fixed priority order setting.

19. The arbitration apparatus claimed in claim 18, wherein, the memory arbitration circuit is provided with a fixed priority order setting in advance and, when there are plural memory masters assigned with medium priority while no memory master has been given high priority, gives the memory use right to a memory master having a highest priority among the memory masters according to the fixed priority order setting.

20. The arbitration apparatus claimed in claim 18, wherein the memory arbitration circuit is provided with a fixed priority order setting in advance and, when there is no memory master assigned with high priority nor one assigned with medium priority, gives the memory use right to a seventh memory master having the highest priority among the memory masters assigned with low priority according to the fixed priority order setting.

21. The arbitration apparatus claimed in claim 18, wherein when only one memory master outputs the request signal, the memory arbitration circuit gives the memory use right to the one memory master.

22. The arbitration apparatus claimed in 12, wherein, the memory arbitration circuit is provided with the fixed priority order setting in advance and, when there are plural memory masters assigned with medium priority while no memory master has been given high priority, gives the memory use right to a memory master having a highest priority among the memory masters according to the fixed priority order setting.

23. The arbitration apparatus claimed in claim 22, wherein the memory arbitration circuit is provided with a fixed priority order setting in advance and, when there is no memory master assigned with high priority nor one assigned with medium priority, gives the memory use right to an eighth memory master having a highest priority among the memory masters assigned with low priority according to the fixed priority order setting.

24. The arbitration apparatus claimed in claim 22, wherein when only one memory master outputs the request signal, the memory arbitration circuit gives the memory use right to the one memory master.

25. The arbitration apparatus claimed in claim 12, wherein the memory arbitration circuit is provided with the fixed priority order setting in advance and, when there is no memory master assigned with high priority nor one assigned with medium priority, gives the memory use right to a fourth memory master having the highest priority among the memory masters assigned with low priority according to the fixed priority order setting.

26. The arbitration apparatus claimed in claim 25, wherein when only one memory master outputs the request signal, the memory arbitration circuit gives the memory use right to the one memory master.

27. The arbitration apparatus claimed in claim 12, wherein when there are plural memory masters assigned with high priority, the memory arbitration circuit gives the memory use right to a fifth memory master that was given the memory use right least recently among the memory masters having high priority according to a round robin scheduling.

28. The arbitration apparatus claimed in claim 27, wherein when there are plural memory masters assigned with medium priority while no memory master has been given high priority, the memory arbitration circuit gives the memory use right to a ninth memory master that was given the memory use right least recently among the memory masters having medium priority according to a round robin scheduling.

29. The arbitration apparatus claimed in claim 27, wherein when there is no memory master assigned with high priority nor one assigned with medium priority, the memory arbitration circuit gives the memory use right to a tenth memory master that was given the memory use right least recently among the memory masters having low priority according to a round robin scheduling.

30. The arbitration apparatus claimed in claim 27, wherein when only one memory master outputs the request signal, the memory arbitration circuit gives the memory use right to the one memory master.

31. The arbitration apparatus claimed in claim 12, wherein when there are plural memory masters assigned with medium priority while no memory master has been given high priority, the memory arbitration circuit gives the memory use right to a memory master that was given the memory use right least recently among the memory masters having medium priority according to a round robin scheduling.

32. The arbitration apparatus claimed in claim 31, wherein when there is no memory master assigned with high priority nor one assigned with medium priority, the memory arbitration circuit gives the memory use right to an eleventh memory master that was given the memory use right least recently among the memory masters having low priority according to a round robin scheduling.

33. The arbitration apparatus claimed in claim 31, wherein when only one memory master outputs the request signal, the memory arbitration circuit gives the memory use right to the one memory master.

34. The arbitration apparatus claimed in claim 12, wherein when there is no memory master assigned with high priority nor one assigned with medium priority, the memory arbitration circuit gives the memory use right to a memory master that was given the memory use right least recently among the memory masters having low priority according to a round robin scheduling.

35. The arbitration apparatus claimed in claim 34, wherein when only one memory master outputs the request signal, the memory arbitration circuit gives the memory use right to the one memory master.

36. The arbitration apparatus claimed in claim 12, wherein when only one memory master outputs the request signal, the memory arbitration circuit gives the memory use right to the one memory master.

* * * * *